United States Patent [19]

Hufnagel

[11] 4,079,445
[45] Mar. 14, 1978

[54] DEVICE FOR VOLTAGE REGULATION OF A SOLAR GENERATOR

[75] Inventor: Heinrich Hufnagel, Abersdorf, Germany

[73] Assignee: Messerschmitt-Bölkow-Blohm GmbH, Munich, Germany

[21] Appl. No.: 723,547

[22] Filed: Sep. 15, 1976

[30] Foreign Application Priority Data

Sep. 30, 1975 Germany ............................ 2543537

[51] Int. Cl.² .............................................. H02M 7/00
[52] U.S. Cl. ....................................... 363/71; 307/57; 323/15; 323/22 T
[58] Field of Search ...................... 307/43, 52, 57, 58, 307/82, 84; 321/27 R; 323/15, 22 T; 363/65, 67, 69, 70, 71

[56] References Cited

U.S. PATENT DOCUMENTS

| | | | |
|---|---|---|---|
| 2,802,952 | 8/1957 | Fairweather | 307/57 |
| 3,047,724 | 7/1962 | Neufville et al. | 307/57 X |
| 3,549,977 | 12/1970 | Watkins | 307/58 X |
| 3,549,983 | 12/1970 | Sprogis | 323/15 |
| 3,626,278 | 12/1971 | Matsumura et al. | 323/22 T |
| 3,696,286 | 10/1972 | Ule | 323/15 |

FOREIGN PATENT DOCUMENTS

718,594  11/1954  United Kingdom ............. 321/27 R

*Primary Examiner*—William M. Shoop
*Attorney, Agent, or Firm*—Toren, McGeady and Stanger

[57] ABSTRACT

A device for the voltage regulation of a solar-type generator by the additive or subtractive connection of generator units to a common bus bar. A logic circuit controls the number of unregulated generator units being connected to the bus bar at any one time depending on the load. A single generator is permanently coupled to the bus bar which generator is regulated to provide improved overall regulation. This single, permanently connected generator is regulated by a series regulator having high feedback loop gain for substantially reducing the output impedance of the single regulated generator in comparison to the unregulated generators. An embodiment incorporating d.c.-a.c. choppers for supplying an a.c. load is also disclosed. In this embodiment, the choppers are directly controlled to effect coupling between a generator and the common bus bar.

10 Claims, 3 Drawing Figures

DEVICE FOR VOLTAGE REGULATION OF A SOLAR GENERATOR

FIELD OF THE INVENTION

This invention relates to a device for voltage regulation of a solar generator consisting of several generator modules which are additive to a common bus bar by way of a logic control or circuit which connects a specific number of unregulated generator modules to the bus bar according to the power requirement of the supplied load. Furthermore, the device contains a regulator to control the voltage within the power step determined by the number of generator modules connected to the power bus.

BACKGROUND OF THE PRESENT INVENTION

It is not possible to provide a high level central power source with solar generators or generators consisting of fuel cells installed in a satellite. The excess power available at the beginning of the mission in comparison to that available at the end of the mission must be transformed to radiated heat. Central regulators for this would have to provide for power dissipation on the order of one kilowatt making them very heavy and, therefore, unsuitable for the mission. For project "Aerosat," the firm ETCA proposed separation of the solar generator into several generator modules. Only the number of generator modules required to satisfy the instantaneous power requirements of the satellite on-board systems are connected to the power bus while the remaining generator modules are short-circuited. Fluctuations between the discrete power increments obtained in this manner are smoothed out by a parallel regulator which centrally maintains a constant voltage on the power bus.

This concept is applied advantageously when the power transmitted to the on-board systems and the power bus potential are not very high. If however, the voltage values exceed 1,000 volts then, for one, the excess heat generated in the short-circuited generator modules must be removed and in addition, because of the solar generator's characteristics, essentially more heat must be transferred in the parallel regulator than, for example, in a series regulator. Moreover, for the concepts mentioned, there are no particulars available of how the difficulties associated with the application of high power alternating current voltage systems can be overcome since the alternating current voltage can hardly be produced centrally.

An object of the invention, therefore, is to provide a device for voltage regulation and power transmission in such incremental-type power supply units and for which the losses are minimized. It is a further object that the device provide a simple and reliable circuit.

SUMMARY OF THE PRESENT INVENTION

In accordance with the present invention, a device for the regulation of a solar-type generator comprises a common bus bar for connection to a load, and a plurality of unregulated generator units having an output adapted to being connected and disconnected from the bus bar. Logic circuit means are included for controlling the number of generator units coupled to the common bus bar, the number of units depending on the load. A single generator permanently coupled to the bus bar and a series regulator are also included, the series regulator for regulating the voltage from the single generator. The regulator has such a high feedback loop gain construction for making the effective source impedance of the single generator substantially smaller than that of the unregulated generator units.

In one form of the invention, the above device includes a plurality of d.c. to a.c. inverters, each being disposed in a respective path between a corresponding generator and the bus bar, and a control oscillator is included for supplying an a.c. driving voltage to the inverters. The inverters have means to control the on-off condition of the inverters wherein the condition is controlled by a signal from the logic circuit means.

For a better understanding of the present invention reference may be made to the following description and accompanying drawings while the scope of the invention will be pointed out in the appended claims.

DETAILED DESCRIPTION OF THE INVENTION

Figure 1:
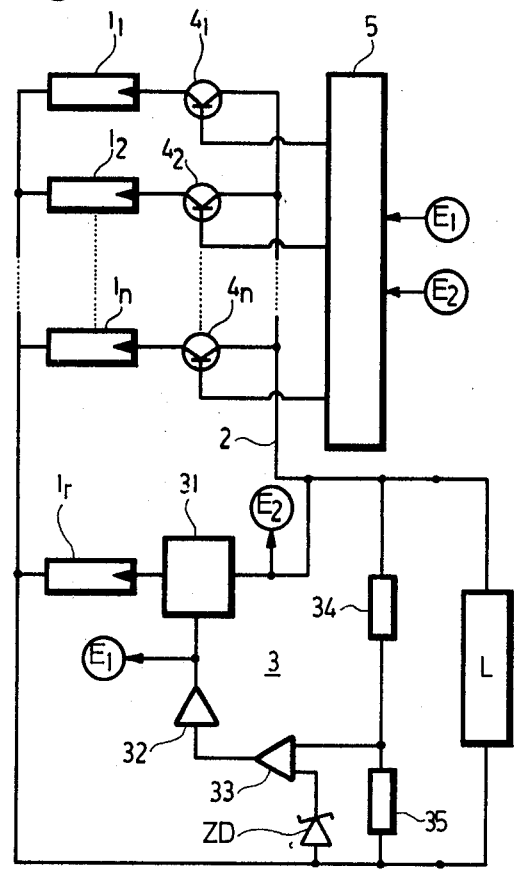
FIG. 1 shows a block diagram of solar generator voltage regulating device in accordance with a first embodiment of the invention.

A solar generator which supplies an on-board satellite system L is composed of several generator modules $1_1$, $1_2-1_n$ which are switched in parallel on to a common bus bar 2. An additional generator module $1_r$ is also connected to the bus bar 2 through a series regulator 3. At any given time, the individual generator modules $1_1$ thru $1_n$ are connected to the bus bar by the respective switches $4_1, 4_2 \ldots 4_n$ which are controlled by way of the logic circuit 5. The logic circuit 5, e.g. a shift register, connects a sufficient number of generator modules $1_1$ thru $1_n$ to the bus bar 2 to cover the on-board satellite system L power requirements. Since the connection of a finite number of generator modules is only possible in steps, generally an excess power capability remains to be stabilized by the series regulator 3.

Since the operating point with the fixed voltage is chosen in the constant current region of the current voltage characteristic, the individual generator modules $1_1$ thru $1_n$ exhibit a high source impedance which is approximately 50 ohms for a 400 w generator module having a 140 volt output. The stability of the overall generator and the uniform division of power between the generator modules is insured to a high degree through the parallel switching of high impedance generator modules.

For voltage stabilization, the remaining generator module $1_r$ is provided with a series regulator which, through a design employing a series regulator with a high loop gain, manifests a low dynamic source impedance. The source impedance is chosen to be approximately one one-thousandth of that of the remaining generator modules. In this manner, it is possible for all generator modules to operate in a steady-state, constant-current mode directly into the regulated output without additional lossy regulators. At a maximum, the output power of one generator module appears as excess energy.

The series regulator consists of a series regulator element 31, a regulator amplifier 32, and a comparator circuit with a differential amplifier 33 which through the voltage divider consisting of impedances 34 and 35 receives one input proportional to the output voltage while the other input has a reference voltage derived from a zener diode ZD applied.

Figure 2:
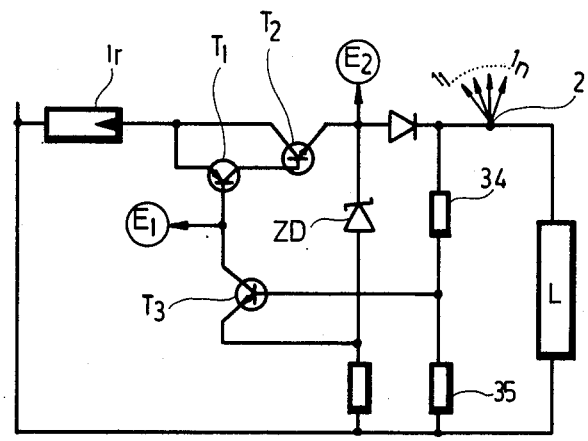
FIG. 2 shows a series regulator circuit diagram for a device in accordance with FIG. 1.

Separately, the series regulator consists of a complementary Darlington stage series regulator element 31 with transistors $T_1$ and $T_2$ switched in cascade, connected to the drive transistor $T_3$ which is biased by means of the zener diode ZD at the mid point of the above-identified voltage divider composed of impedances 34 and 35. As shown in FIG. 2, the remaining generator modules are directly connected to the bus bar 2. The excess power occurring from time to time is dissipated in a known or normal manner in the regulator element 31 constructed with a complementary Darlington stage.

If the power requirement of the on-board system L rises so that the available generator modules connected to the bus bar 2 can no longer satisfy this power requirement, the voltage drop across the series regulator goes below zero. In this event, a signal is provided at the input $E_1$ of the logic circuit through which an additional generator module is connected to the bus bar. As soon as the power requirement of the on-board system drops below the power increment to be stabilized by the series regulator, that is, the series regulator current approaches zero, a signal is provided at the input $E_2$ of the logic circuit so that one of the generator modules currently connected to the bus bar 2 is disconnected.

Figure 3:
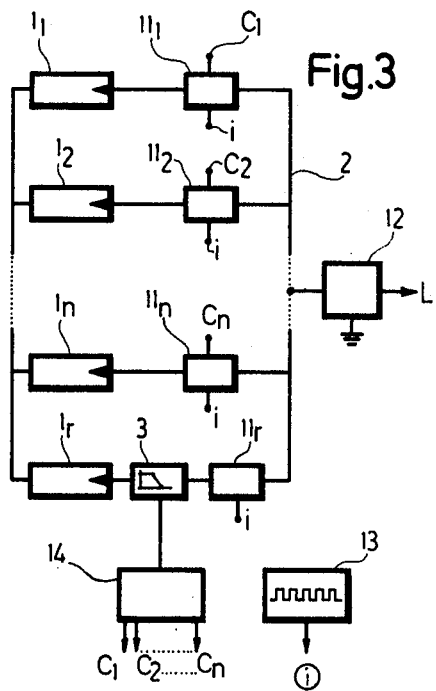
FIG. 3 shows a block diagram of a second embodiment of the invention for an alternating current voltage system.

A digitally regulated alternating current voltage system is described in the second embodiment of FIG. 3. In this arrangement, the solar generator is again composed of individual solar generators $1_1, 1_2, \ldots 1_r$ each of which has an associated chopper, that is, DC/AC converter $11_1, 11_2 \ldots 1_r$. The outputs of the DC/AC converters 11 are connected to the on-board system by way of the bus bar and a double adjustable transformer 12 shown here only for identification.

Of the individual generator modules, all but the general module $1_r$ are again unregulated, whereas the latter is connected to the series regulator 3 already described. The individual chopper modules are controlled through the control inputs $i$ from a control oscillator 13. In this manner, a regulated direct current voltage and alternating current voltage respectively are produced from the unregulated generator modules 1 and the alternating current voltage is delivered to the on-board satellite systems through the adjustable transformer 12.

The series regulator 3 is connected to a logic circuit 14 or control which is constructed similarly to the logic circuit or control in FIG. 1 and which serves to connect the individual generator modules 1 to the bus bar 2. This connection and disconnection to be sure does not take place in the power path as in the first arrangement of FIG. 1 but through control of the individual chopper modules $11_1$ to $11_n$ by their control inputs $C_1, C_2, \ldots C_n$. This form of control for DC/AC inverters is already known from the space program and therefore, requires no further description.

Thus, the objects of the invention are satisfied, by constructing or designing the regulator, which exhibits a high feedback, loop gain, as a permanent part of a single generator module connected to the power bus. This makes the source impedance of this generator module essentially smaller than that of the remaining generator modules.

The system of the invention has been designed using the consideration that, on the one hand, only active two-pole current generators or sources, in this case, the individual generator modules, can be switched in parallel without interaction; on the other hand, however, this in not compatible with the voltage stability requirement of the power installation or supply. The necessary voltage stability and non-interactive additive switching of the individual generator modules has been realized through the proposed balanced series voltage regulation of one of the generator modules whose output inpedance, due to the high feedback loop gain, is designed to be very low and direct, i.e., unregulated, application of the remaining generator modules upon the regulated output in accordance with the power requirements of the on-board satellite systems.

The application of the unregulated generator modules is achieved in the current source region of the characteristic curve so that the source impedance of every additive unregulated generator module at its operating point is essentially larger than the regulated generator module's source impedance which is artificially maintained low; commonly, the condition is chosen such that, through the internal impedance of a variable gain amplifier, the source impedance of the stabilized module is selected to be 50 millohms while the typical value of source impedance for a generator module with 400 watt output capability is 50 ohms.

The efficiency of a voltage regulator in accordance with the invention is thus very high since, as a whole, the mismatch is small and the resultant deliverable current capability for the fixed output voltage generator as well as for a direct feed generator module in a non-degraded condition lies only a few percentage points below the maximum capability.

The total cost for a power installation maintaining constant voltage in accordance with the invention is very small, so that, for example, the regulation of a solar generator consisting of 16 generator modules, which provide about 400 watts in a non-degraded condition, requires only one 400-watt series regulator for one of the generator modules and a load dependent automatic control means or mechanism. The load dependent automatic control mechanism operates such that, for an increasing power requirement, an additional generator module is added or connected to the power bus and for a decreasing power requirement a generator module is disconnected from the power bus. The automatic control mechanism is controlled by the regulator in such a manner that an additional generator module is added or connected when the input and the regulated output voltage become equal and a generator module is removed or disconnected when the regulator current approaches zero.

If alternating current voltage is required for the on-board systems, each generator module has an associated chopper which receives timing control from a load-dependent automatic control mechanism. With this, the individual generator modules in a power branch or leg are not connected and disconnected but the choppers required at any given time are taken out of service by the removal of the timing control simultaneous with the removal of the load. The application of constant voltage power provided in this manner to the on-board systems appears preferable to rotary converters.

It has been shown that this type of regulation is possible not only for solar generators but for all generators exhibiting a constant current mode and a constant voltage mode in their output characteristic curve as, for example, generators consisting of fuel cells.

While the invention has been particularly shown and described with reference to the preferred embodiments thereof, it will be understood by those skilled in the art that various modifications and changes in form and detail may be made therein without departing from the true spirit and scope of the present invention.

What is claimed is:

1. A device for the voltage regulation of a solar-type generator comprising:
    a common bus bar for connection to a load;
    a plurality of unregulated generator units having an output adapted to being connected and disconnected from said bus bar;
    logic circuit means for controlling the number of generator units coupled to said common bus bar, said number of units depending upon the load;
    a single generator permanently coupled to said bus bar; and
    a series regulator for regulating the voltage from said single generator, said regulator having such a high feedback loop gain for making the effective source impedance of said single generator substantially smaller than that of said unregulated generator units.

2. A device in accordance with claim 1 wherein the effective source impedance of the regulated generator is about one one-thousandth of the source impedance of the unregulated generator units.

3. A device in accordance with claim 1 wherein the regulator element in the series regulator is provided as a complementary Darlington stage.

4. A device in accordance with claim 3 including a voltage divider for being disposed across the load, a reference diode, a comparator responsive to the voltage divider output and the voltage across the reference diode, and an amplifier responsive to the comparator output for driving said complementary Darlington stage.

5. A device in accordance with claim 4 wherein said comparator and amplifier comprise a single transistor.

6. A device for the voltage regulation of a solar-type generator comprising:
    a common bus bar for connection to a load;
    a plurality of unregulated generator units having an output adapted to being connected and disconnected from said bus bar;
    logic circuit means for controlling the number of generator units coupled to said common bus bar, said number of units depending upon the load;
    a single generator permanently coupled to said bus bar; and
    a series regulator for regulating the voltage from said single generator, said regulator having such a high feedback loop gain for making the effective source impedance of said single generator substantially smaller than that of said unregulated generator units, and wherein a signal is supplied from the series regulator to the logic circuit means indicating when the voltage drop across the regulator goes below zero, said logic means responding by connecting an additional unregulated generator to the bus bar.

7. A device for the voltage regulation of a solar-type generator comprising:
    a common bus bar for connection to a load;
    a plurality of unregulated generator units having an output adapted to being connected and disconnected from said bus bar;
    logic circuit means for controlling the number of generator units coupled to said common bus bar, said number of units depending upon the load;
    a single generator permanently coupled to said bus bar; and
    a series regulator for regulating the voltage from said single generator, said regulator having such a high feedback loop gain for making the effective source impedance of said single generator substantially smaller than that of said unregulated generator units, and wherein a signal is supplied from the series regulator to the logic circuit means indicating when the series regular current approaches zero, said logic means responding by disconnecting an unregulated generator from the bus bar.

8. The device of claim 6 including a plurality of series switches, each switch being disposed between a corresponding unregulated generator unit and said bus bar, said switches being controlled by said logic circuit means.

9. The device of claim 6 including a plurality of d.c. to a.c. inverters, each being disposed in a respective path between a corresponding generator and said bus bar, a control oscillator supplying an a.c. driving voltage to said inverters, said inverters having means to control the on-off condition of said inverters wherein the condition is controlled by a signal from said logic circuit means.

10. The device of claim 9 wherein said control oscillator provides a square wave signal for effecting chopping action of said inverter.

* * * * *